March 30, 1948.  C. W. SNADECKI ET AL  2,438,830
RADIATION PYROMETER HOUSING FOR FURNACES
Filed April 3, 1945
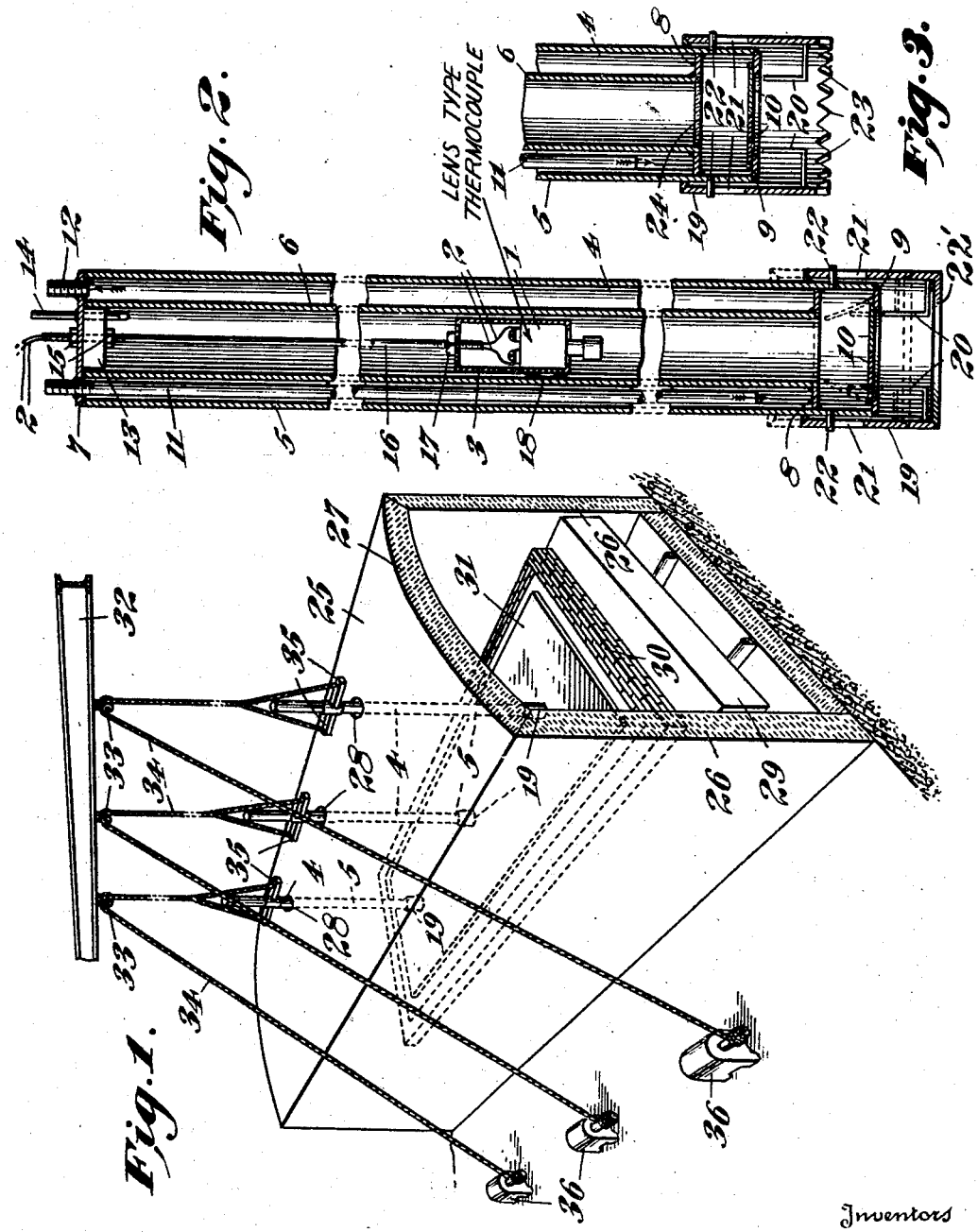
Inventors
Clarence W. Snadecki
and Ward F. Richards.
By R. S. A. Dougherty.
Attorney Patented Mar. 30, 1948

2,438,830

UNITED STATES PATENT OFFICE 2,438,830

RADIATION PYROMETER HOUSING FOR FURNACES

Clarence W. Snadecki and Ward F. Richards, Bethlehem, Pa., assignors to Bethlehem Steel Company, a corporation of Pennsylvania Application April 3, 1945, Serial No. 586,292

6 Claims. (Cl. 136—4)

This invention relates to pyrometer devices and more particularly to a radiation pyrometer device for use in measuring the temperature of heavy metal plates and the like in heating furnaces.

Radiation pyrometers consist essentially of arrangements of lenses and mirrors, or either alone, concentrating heat rays upon extremely sensitive thermocouples in accordance with the Stefan-Boltzman Law that a heated black body emits energy in proportion to the fourth power of its absolute temperature. The minute electric currents generated by the thermocouples are then measured upon suitably calibrated galvanometers.

Theoretically, the radiation pyrometer has the advantage that it will give, without direct contact, readings limited to the particular heated surface upon which it is focused, instead of reading the furnace temperatures which may be several hundred degrees higher than those of the work under treatment. In practice, however, it has been found that the temperature effects of flame, side wall reflection and furnace atmosphere can greatly interfere with the accuracy of the desired readings.

One object of our invention, therefore, is to provide a radiation pyrometer device which will take only readings of actual object temperatures.

Another object is to provide means for preventing water vapor or furnace gases, or flame or side wall radiations, from adversely influencing special temperature determinations.

A further object is to provide a reliable and fully automatic pyrometric device for recording elevated temperatures, which device will also have prolonged service life.

Additional objects, purposes and advantages of this invention will appear hereinafter in the specification and in the appended claims.

In order that the invention may be more readily understood, we shall now refer to the sheet of drawings hereunto annexed and in which like characters of reference will designate like parts;

Figure 1 is a perspectitve diagrammatic view of a typical furnace for hardening armor plate and the like, showing means for inserting and removing three temperature measuring devices at the same time when it is desired to take three location readings;

Fig. 2 is a broken sectional view of one form of temperature measuring device; and Fig. 3 is a sectional view of an alternative bottom arrangement of the temperature measuring device.

Referring to Fig. 2 of the drawings, our improved temperature measuring apparatus in part comprises a radiation-responsive device 1, preferably of the familiar thermocouple-lens type shown, connected by the wire leads 2 to an indicating or recording device (not shown), which is preferably a temperature-calibrated millivolt meter of the curve-drawing type. High speed high sensitivity instruments, such as the "Rayotube" radiation pyrometers and "Micromax" temperature recorders manufactured by Leeds & Northrup Company, have been found to be especially well adapted for this service.

The radiation-responsive device 1 is housed in a suitable small metal box or retainer 3, which in turn is enclosed within a protective water jacket 4. Said water jacket 4 comprises an elongated outer metal tube 5 and a somewhat shorter inner sighting tube 6, the latter being held centrally within the former tube by a flat metal ring 7 at the top and a like metal ring 8 at the bottom of the tube 6, both rings being welded in place. A similar ring 9 provided with a pair of hinged shutters 10 is welded inside the bottom of the outer tube 5. The top ring 7 is provided with apertures through which pass the long inlet pipe 11 and the outlet nipple 12, the cooling water being supplied to the pipe 11 and the spent water removed through the nipple 12 by means of flexible tubing (not shown). The cap or cover 13 having the short air inlet pipe 14 is fastened removably or permanently as desired over the top of the inner tube 6 to prevent the central opening thereof from acting as a chimney. A flexible air line (not shown) connected to the pipe supplying a steady flow of air at low pressure helps to maintain a clear inside atmosphere. Secured by lock nuts 15 centrally of said cover 13 depends a long pipe 16, which is threaded for a sufficient distance to permit vertical adjustment to any desired point. At the bottom end, also threaded, the pipe 16 is secured to the retainer 3 by the lock nuts 17, and from the radiation responsive device 1 the wire leads 2 pass through said pipe 16 to the recording device (not shown). Equally spaced small flat spring-like shoes 18 attached to the outside of the retainer 3 keep the assembly rigid and centered within the sighting tube 6.

Around the lower end of the water jacket 4 is a metal sleeve 19, said sleeve being slightly larger in inside diameter than the outside diameter of the water jacket and provided with a pair of inwardly and upwardly projecting arms 20 and a pair of equally spaced vertical slots 21. A correspondingly spaced pair of pins 22 secured to the outside of the water jacket 4 and movable in the slots 21 permit the sleeve to slide up and down relative to said water jacket so that the arms 20 can actuate the shutters 10. To minimize the conduction of heat away from the object, the metal sleeve 19 may be provided with a beveled lower edge 22', as shown in Fig. 2, or a series of serrations 23, as shown in Fig. 3, may optionally be provided on the lower edge of said sleeve 19. Another optional feature is the quartz window 24, which may be cemented or otherwise secured in place above the shutters 10.

Referring now to Fig. 1 of the drawings, the numeral 25 designates the furnace, provided with refractory side walls 26, a refractory roof 27 having the apertures 28, and a movable car 29. On said car 29, an open box 30 of firebrick or the like holds the plate 31 undergoing treatment in the furnace 25. From the I-beam 32 or other supporting means above said furnace 25 is suspended a train of pulleys 33, over which pulleys pass the hoisting cables 34. To each water jacket 4 is secured a pair of side arms 35 to which is attached one of the hoisting cables 34. Electric or air motors 36 are provided adjacent the furnace 25 to reel and unreel said hoisting cables 34. Control of the operation of the motors 36 may be had either manually, by means of conventional switches or valves, or automatically, at preset intervals, by connecting any one of a number of well-known electrical timer devices, such as, for example, the types shown in the United States patents to Johnson, 1,978,947, and Anderson, 2,175,864 and 2,175,865, to actuate relay switches or motor-driven valves (not shown) in understood manner.

With regard to operation, while three sets of devices are shown in Fig. 1, the method of taking a single temperature reading will sufficiently illustrate the use of our invention. Thus, at a predetermined time, the radiation-responsive device 1 within its protecting jacket 4 is lowered carefully through the aperture 28 into the furnace 25. As soon as the sleeve 19 rests upon the hot plate 31, any further lowering of said jacket 4 will cause the two arms 20 to push open the split shutters 10, so as to offer the radiation-responsive device 1 a full view of the plate surface. Approximately ten seconds in this position will usually be required to measure the radiant energy from the plate. The jacket 4 then starts its upward travel from the furnace. The shutters 10 will close again just before the sleeve 19 leaves the plate 31, thus sealing the radiation-responsive device 1 from the flame and side wall reflections. By this procedure, the recorder is allowed to read only from the low reading to the specific temperature under measurement.

Although we have hereinabove shown and described our invention in considerable detail, we do not wish to be limited to the exact construction so shown and described, but we may use also such substitutions, modifications or equivalents thereof as are embraced within the scope of the invention, or pointed out in the appended claims.

In accordance with the statute, what we claim as new and useful is:

1. The combination with a furnace having a chamber in which material is heated, of a radiation responsive device, a protective casing having an opening for admitting thermal radiation from the material to the radiation responsive device, shutters hinged in said opening, and a slidable sleeve on the casing provided with upwardly projecting arms adapted to push open said shutters upon contact of the sleeve with the material and to close them upon withdrawal therefrom.

2. A device for measuring the temperature of work within a furnace, comprising a radiation responsive device, a protective tube enclosing the radiation responsive device, normally closed shutters mounted on bottom of the tube, means for automatically opening the shutters on contact between the tube and work, and a beveled edge on the bottom of the device to exclude furnace gases and prevent forming cold spots on the work when in contact therewith.

3. A device for measuring the temperature of work within a furnace, comprising a radiation responsive device, a protective tube enclosing the radiation responsive device, means for placing the tube in brief contact with the work, split shutters mounted on the bottom of the protective tube, and means for pushing open the shutters when the tube is placed in contact with the work.

4. A device for measuring the temperature of work within a furnace, comprising a radiation responsive device, a protective tube enclosing the radiation responsive device having a sight opening at one end, shutters normally closed at said opening, means for depositing the tube on the work, and means actuated by the weight of the tube on the work for opening the shutters and exposing the radiation responsive device to view the work.

5. A device for measuring the temperature of work within a furnace, comprising a radiation responsive device, a sighting tube enclosing the radiation responsive device having an opening at one end permitting said device to be sighted on the work surface, shutters positioned at the opening and normally closing said opening, and a sliding sleeve outside the bottom of the sighting tube having inwardly and upwardly projecting arms for opening said shutters when the sleeve contacts the work surface.

6. A device for measuring the temperature of work within a furnace, comprising a radiation responsive device, a sighting tube enclosing the radiation responsive device having an aperture at one end permitting said device to be sighted on the work surface, shutters normally closing said aperture, a sliding sleeve adjacent said aperture provided with means for opening said shutters, and pin-and-slot guide means for restricting the motion of the sleeve.

CLARENCE W. SNADECKI.
WARD F. RICHARDS.

REFERENCES CITED

The following references are of record in the file of this patent:

UNITED STATES PATENTS

| Number | Name | Date |
| --- | --- | --- |
| 1,038,258 | Zander | Sept. 10, 1912 |
| 1,423,393 | Boston | July 18, 1922 |
| 1,667,355 | Norton | Apr. 24, 1928 |
| 2,025,015 | Byrns | Dec. 17, 1935 |
| 2,073,112 | Lindinger | Mar. 9, 1937 |
| 2,194,489 | Woodson | Mar. 26, 1940 |
| 2,366,285 | Percy et al. | Jan. 2, 1945 |
| 2,369,624 | Vollrath | Feb. 13, 1945 |